US012062839B2

United States Patent
Jeong

(10) Patent No.: US 12,062,839 B2
(45) Date of Patent: *Aug. 13, 2024

(54) ANTENNA SYSTEM LOADED IN VEHICLE AND VEHICLE HAVING THE SAME

(71) Applicant: LG ELECTRONICS INC., Seoul (KR)

(72) Inventor: Sunin Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

This patent is subject to a terminal disclaimer.

(21) Appl. No.: 17/376,997

(22) Filed: Jul. 15, 2021

(65) Prior Publication Data

US 2021/0344107 A1    Nov. 4, 2021

Related U.S. Application Data

(63) Continuation of application No. 16/352,342, filed on Mar. 13, 2019, now Pat. No. 11,121,456.

(30) Foreign Application Priority Data

Oct. 30, 2018    (WO) ................ PCT/KR2018/012959

(51) Int. Cl.
*H01Q 1/32*    (2006.01)
*H01Q 1/36*    (2006.01)
*H01Q 21/06*   (2006.01)

(52) U.S. Cl.
CPC ............ *H01Q 1/3208* (2013.01); *H01Q 1/36* (2013.01); *H01Q 21/061* (2013.01)

(58) Field of Classification Search
CPC ...... H01Q 1/3208; H01Q 1/36; H01Q 1/3275; H01Q 21/061; H01Q 21/205; H04B 7/0413; H04B 7/0617; B60R 25/245; B60R 16/023
See application file for complete search history.

(56) References Cited

U.S. PATENT DOCUMENTS

| 5,400,042 | A | 3/1995 | Tulintseff | |
| 10,056,922 | B1 * | 8/2018 | Tsvelykh | .................. H01P 1/20 |
| 10,256,545 | B2 | 4/2019 | Boryssenko et al. | |
| 10,547,118 | B2 | 1/2020 | Guntupalli et al. | |
| 11,121,456 | B2 * | 9/2021 | Jeong | .................. H01Q 21/205 |
| 2003/0137456 | A1 | 7/2003 | Sreenivas et al. | |
| 2006/0232479 | A1 | 10/2006 | Walton | |
| 2008/0030416 | A1 | 2/2008 | Lee et al. | |

(Continued)

FOREIGN PATENT DOCUMENTS

| GB | 2578599 A * | 5/2020 | ............. H01Q 1/325 |
| JP | 2017-41879 A | 2/2017 | |

(Continued)

*Primary Examiner* — Seokjin Kim
(74) *Attorney, Agent, or Firm* — Birch, Stewart, Kolasch & Birch, LLP

(57) ABSTRACT

A vehicle antenna system for being loaded on a vehicle can include a telematics part; and an antenna structure coupled to at least one side surface of the telematics part, in which the antenna structure includes a plurality of antenna elements configured to transmit or receive first radio signals in a first communication system, and an end portion of the telematics part corresponding to the at least one side surface is coupled to the antenna structure.

18 Claims, 10 Drawing Sheets

(56) References Cited

U.S. PATENT DOCUMENTS

| | | |
|---|---|---|
| 2008/0111757 A1 | 5/2008 | Bisiules et al. |
| 2009/0028225 A1* | 1/2009 | Runyon .................. H04B 1/18 |
| | | 375/219 |
| 2011/0059688 A1 | 3/2011 | Noonan et al. |
| 2013/0050056 A1 | 2/2013 | Lee et al. |
| 2014/0043204 A1 | 2/2014 | Basnayake et al. |
| 2015/0071137 A1* | 3/2015 | Thiam ................... H01Q 1/521 |
| | | 343/702 |
| 2016/0211585 A1 | 7/2016 | Chau et al. |
| 2017/0054204 A1* | 2/2017 | Changalvala ............ H01Q 1/42 |
| 2018/0191072 A1* | 7/2018 | Apostolos ................ H01Q 3/40 |
| 2018/0366817 A1* | 12/2018 | Sung ....................... H01Q 1/38 |
| 2019/0013592 A1 | 1/2019 | West et al. |
| 2019/0089419 A1* | 3/2019 | Kim ...................... H01Q 21/28 |
| 2019/0260137 A1 | 8/2019 | Watanabe et al. |
| 2019/0319369 A1 | 10/2019 | Chiang et al. |
| 2019/0348754 A1* | 11/2019 | Apostolos ............ H01Q 1/3275 |
| 2019/0393589 A1* | 12/2019 | Apostolos ............ H01Q 21/065 |
| 2020/0014429 A1 | 1/2020 | Leung |
| 2020/0106158 A1 | 4/2020 | Gomez Angulo et al. |
| 2020/0106178 A1 | 4/2020 | Chou |
| 2020/0185826 A1 | 6/2020 | Park et al. |
| 2021/0057806 A1* | 2/2021 | Katsura .................... H01Q 3/26 |
| 2021/0066808 A1* | 3/2021 | Tanaka ................... H01Q 13/10 |
| 2021/0195388 A1* | 6/2021 | Miyagawa .............. H04W 4/40 |
| 2022/0037776 A1* | 2/2022 | Sung .................... H01Q 1/3275 |

FOREIGN PATENT DOCUMENTS

| | | | |
|---|---|---|---|
| KR | 10-2014-0103762 A | 8/2014 | |
| KR | 10-2016-0120643 A | 10/2016 | |
| KR | 10-1727488 B1 | 4/2017 | |
| KR | 10-2018-0025066 A | 3/2018 | |
| KR | 10-2018-0070380 A | 6/2018 | |
| WO | WO 2017/076750 A1 | 5/2017 | |
| WO | WO 2018/043808 A1 | 3/2018 | |
| WO | WO-2019150666 A1 * | 8/2019 | .......... H01Q 1/3208 |

* cited by examiner

FIG. 1
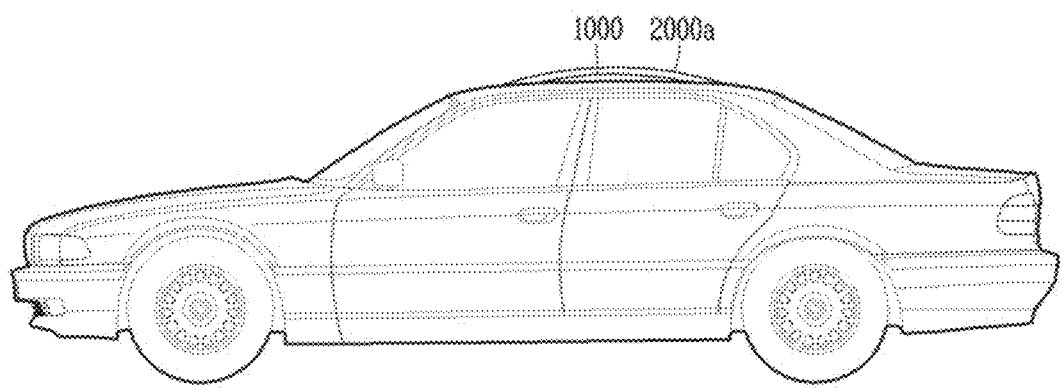
(a)
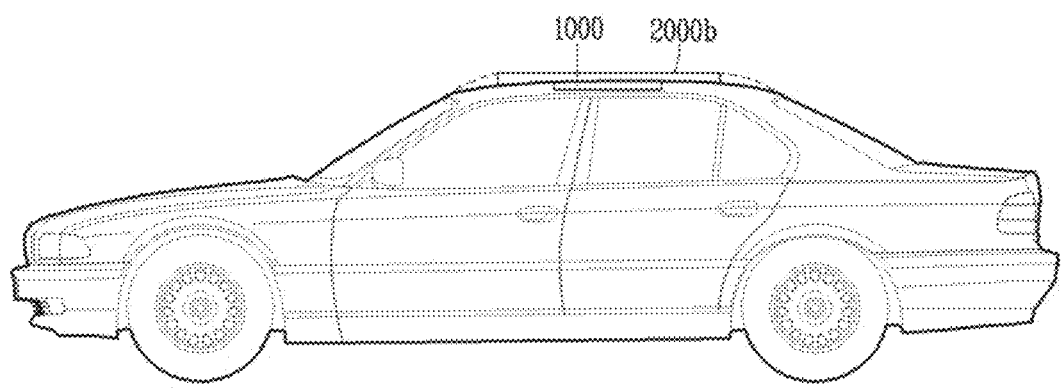
(b)

FIG. 4
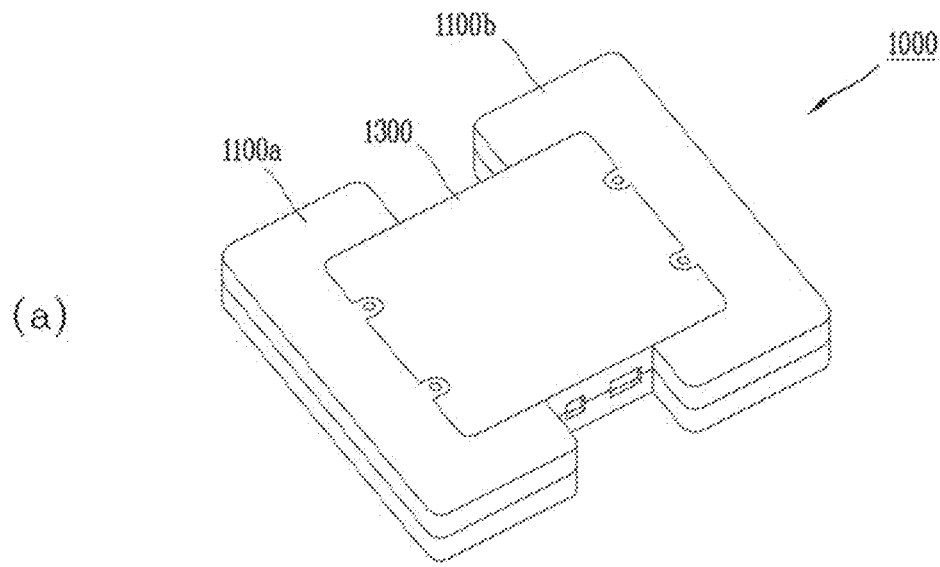
(a)
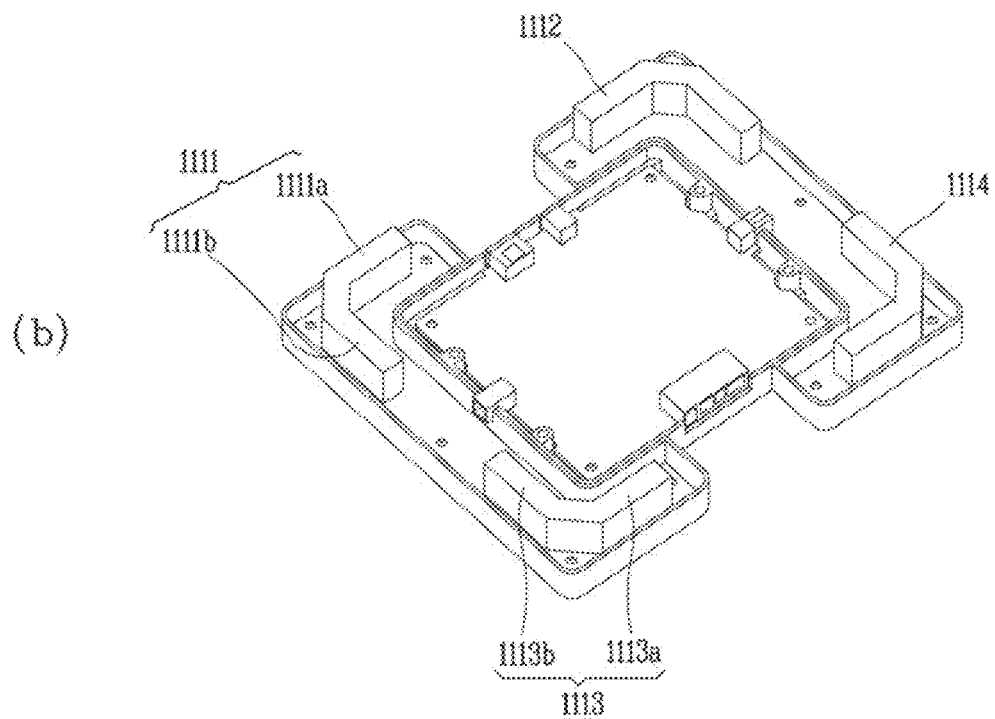
(b)

FIG. 5
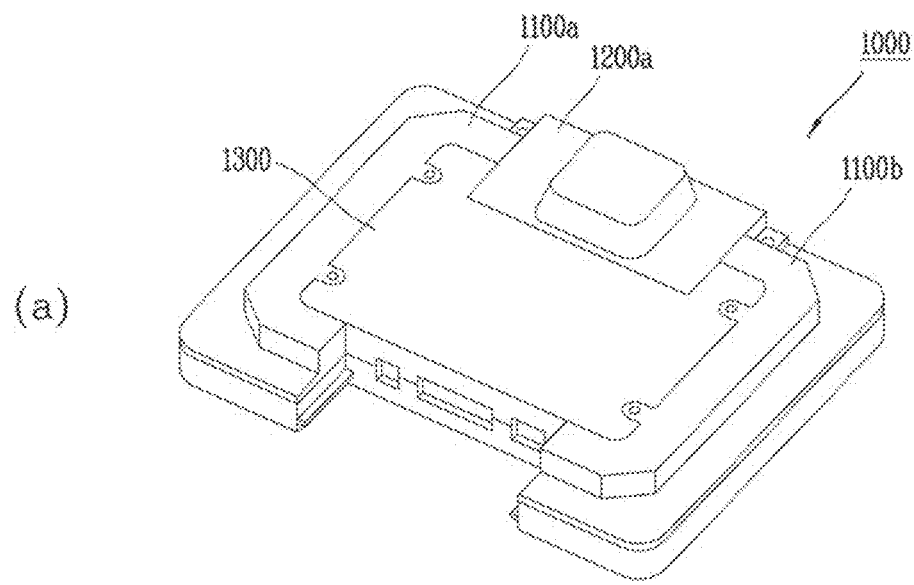
(a)
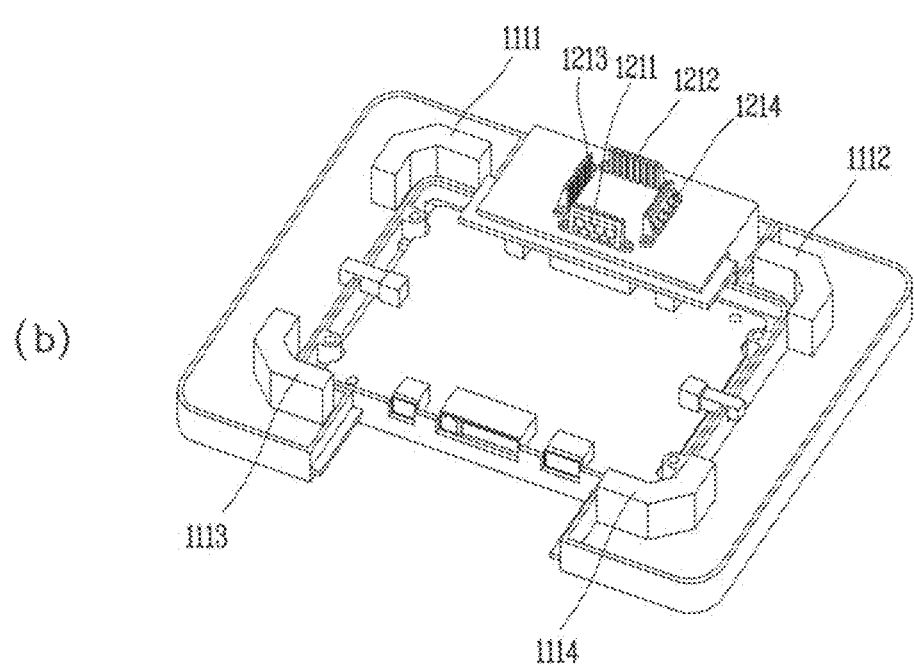
(b)

FIG. 6
(a) 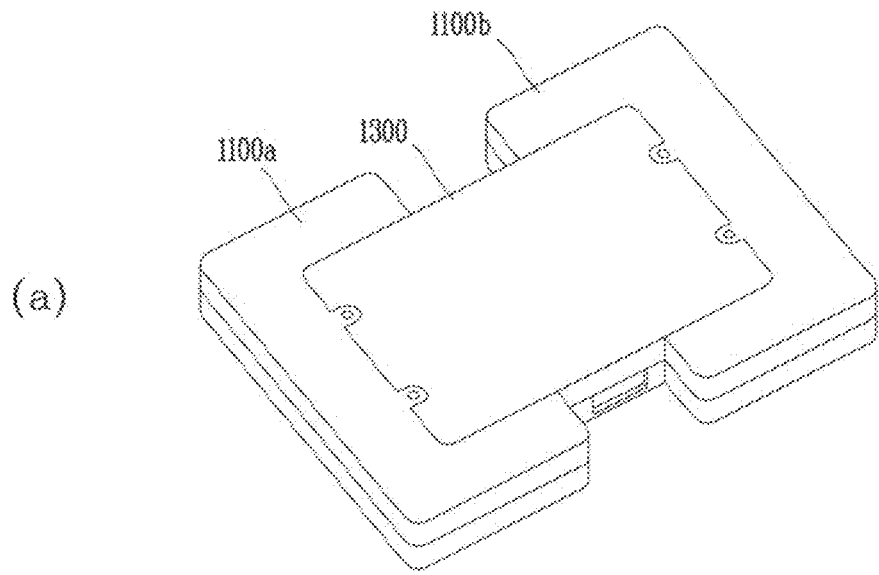
(b) 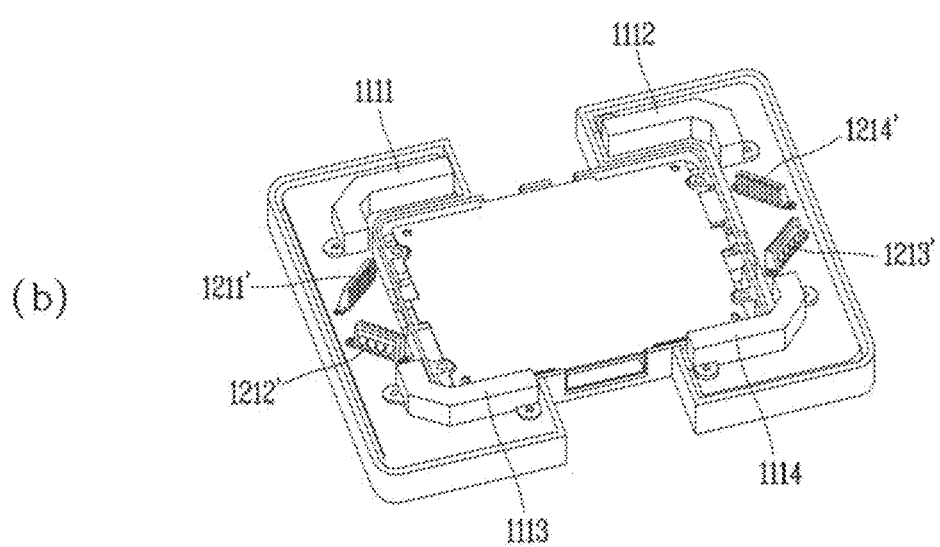

ANTENNA SYSTEM LOADED IN VEHICLE AND VEHICLE HAVING THE SAME

CROSS-REFERENCE TO RELATED APPLICATIONS

This application is a Continuation of copending application Ser. No. 16/352,342, filed on Mar. 13, 2019, which claims priority under 35 U.S.C. § 119(a) to International Application No. PCT/KR2018/012959 on Oct. 30, 2018, all of which are hereby expressly incorporated by reference into the present application.

BACKGROUND OF THE DISCLOSURE

1. Field of the Invention

The present invention relates to an antenna system loaded in a vehicle, and more particularly, an antenna system, which is loaded in a vehicle for providing communication services by transmitting and receiving a plurality of communications signals, and a vehicle having the antenna system.

2. Background Art

Terminals may be divided into mobile/portable devices and stationary devices according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, there is an increasing need to provide communication services and multimedia services by mounting such mobile terminals in vehicles. Meanwhile, there is a need for a fifth generation (5G) communication service, which is a next generation communication service, as well as existing communication services such as LTE (Long Term Evolution) and the like, in relation to communication services.

In this regard, discussion on the specification of the 5G communication service has not been completed, and an antenna system and a communication system for realizing such a service in a vehicle have not been discussed. In addition, a detailed method for implementing a flat antenna in relation to loading a vehicle antenna system in a vehicle has not been presented.

In addition, the vehicle antenna system needs to support not only the 5G communication system but also communication services such as LTE, which is an existing communication service. In this regard, LTE supports a Multi-Input Multi-Output (MIMO) mode for improving transmission speed. However, in order to support such a MIMO mode, isolation between LTE antennas is important. However, there is a problem that a method of ensuring sufficient isolation between the LTE antennas while maintaining sizes mountable in the vehicle has not been disclosed in detail.

In addition, when an antenna of a 4G communication system such as LTE and an antenna of a 5G communication system are arranged, isolation between them is also important. In this regard, it is particularly important in LTE re-farming in which an antenna of a 5G communication system operates in a sub-6 band of 6 GHz or less or partially uses a frequency band of a 4G communication system. Therefore, there is a problem in that a method of ensuring sufficient isolation between antennas of a plurality of communication systems, in consideration of their sizes loadable in a vehicle, has not been specifically presented.

SUMMARY OF THE INVENTION

One aspect of the present invention is to provide a flat vehicle antenna capable of providing next generation communication services as well as existing mobile communication services, and an arrangement structure thereof.

Another aspect of the present invention is to provide communication services using a plurality of antennas for providing a plurality of communication services by effectively arranging the plurality of antennas on a vehicle antenna system structure.

An antenna system loaded on a vehicle according to the present invention includes a telematics module, and antenna modules coupled to both side surfaces of the telematics module, wherein the antenna modules have a plurality of antenna elements disposed therein so as to perform Multiple-Input and Multi-Output (MIMO) by transmitting or receiving a plurality of first signals according to a first communication system through the plurality of antenna elements, whereby a plurality of communication services can be provided through a flat vehicle antenna.

According to one embodiment, the antenna modules may have first to fourth antenna elements therein to perform 4×4 MIMO. Here, the first to fourth antenna elements may be disposed in upper and lower ends of the respective antenna modules coupled to the both side surfaces of the telematics module.

According to one embodiment, the first to fourth antenna elements may include a first member disposed at one of a left upper end, a right upper end, a left lower end, and a right lower end of the antenna modules, and a second member connected at a right angle to the first member to operate as an antenna together with the first member. Here, the first member and the second member may form a resonance length by a sum of lengths thereof.

According to one embodiment, the antenna modules may be coupled to the telematics module by sliding rail structures, respectively. Here, the antenna modules may be coupled to upper and lower end portions of the telematics module, corresponding to the both side surfaces, by use of bolts.

According to one embodiment, the antenna system may further include a second antenna module disposed on an upper part of the telematics module Here, the second antenna module may have a plurality of array antennas disposed therein, and transmit or receive second signals according to a second communication system through one of the plurality of array antennas.

According to one embodiment, the second antenna module may have first to fourth array antennas disposed therein and perform beam-forming through one of the first to fourth array antennas.

According to one embodiment, the first to fourth array antennas may have a form printed on a substrate that is formed perpendicular to a lower end portion. Here, the first to fourth array antennas may be disposed at intervals of 90 degrees with respect to one another to cover 90-degree regions, respectively, in an azimuth direction.

According to one embodiment, the antenna modules may have a plurality of array antennas disposed therein, and transmit or receive second signals according to a second communication system through one of the plurality of array antennas.

According to one embodiment, the antenna modules may have first to fourth array antennas disposed therein and perform beam-forming through one of the first to fourth array antennas.

According to one embodiment, the first to fourth array antennas may have a form printed on a substrate that is formed perpendicular to a lower end portion. Here, the first and second array antennas may be disposed at an interval of 90 degrees therebetween with respect to a center line within the antenna module connected to a left side of the telematics module. Also, the third and fourth array antennas may be disposed at an interval of 90 degrees therebetween with respect to the center line within the antenna module connected to a right side of the telematics module.

According to one embodiment, the first and second array antennas may be disposed at an interval 90 degrees, adjacent to first to fourth antenna elements corresponding to the plurality of antenna elements. Here, the first to fourth antenna elements may be arranged at intervals of 90 degrees with respect to one another to improve isolation therebetween.

According to one embodiment, the antenna modules may be coupled to the both side surfaces of the telematics module through Radio Frequency (RF) connectors, respectively. Here, the plurality of antenna elements operating in the first communication system may be fed through the RF connectors.

According to one embodiment, the second antenna module may be connected to the telematics module through a 2×4 port connector. Here, the plurality of antenna elements operating in the first communication system and the plurality of array antennas operating in the second communication system are fed through the 2×4 port connectors.

A vehicle equipped with an antenna system according to another aspect of the present invention may include a telematics module, a controller to control the telematics module and components of the vehicle, and antenna modules to transmit or receive a plurality of communication signals from the telematics module. Meanwhile, the antenna modules may have first to fourth antenna elements therein and perform 4×4 MIMO by transmitting and receiving a plurality of first signals according to a first communication system through the plurality of antenna elements.

According to one embodiment, the antenna modules may have first to fourth antenna elements therein to perform 4×4 MIMO. Here, the first to fourth antenna elements are disposed in upper and lower ends of the antenna modules coupled to the both side surfaces of the telematics module.

According to one embodiment, the antenna system may further include a second antenna module disposed on the telematics module Here, the second antenna module may have a plurality of array antennas disposed therein, and transmit or receive second signals according to a second communication system through one of the plurality of array antennas.

According to one embodiment, the second antenna may have first to fourth array antennas disposed therein and perform beam-forming through one of the first to fourth array antennas. Here, the first to fourth array antennas may be disposed at intervals of 90 degrees with respect to one another to cover 90-degree regions, respectively, in an azimuth angle direction.

According to one embodiment, the antenna modules may have a plurality of array antennas disposed therein, and transmit or receive second signals according to a second communication system through one of the plurality of array antennas.

According to one embodiment, the antenna modules may have first to fourth array antennas disposed therein and perform beam-forming through one of the first to fourth array antennas. Here, the first to fourth array antennas may have a form printed on a substrate that is formed perpendicular to a lower end portion.

Effects of the Disclosure

Hereinafter, effects of an antenna system loaded on a vehicle and a method of controlling the same according to the present invention will be described.

According to the present invention, a plurality of communication services can be provided through a flat vehicle antenna having beamforming array antennas capable of providing a next generation communication service and MIMO antennas capable of providing an existing mobile communication service.

In addition, according to the present invention, a plurality of communication services can be provided by using one or more antenna modules integrally coupled to a telematics module.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 1 is a view illustrating a structure for loading an antenna system in a vehicle, in a mobile terminal having the antenna system loaded in the vehicle.

FIG. 4 is a view illustrating an antenna system supporting a first communication system in accordance with one embodiment of the present invention.

FIG. 5 is a view illustrating an antenna system supporting first and second communication systems in accordance with another embodiment of the present invention.

FIG. 6 is a view illustrating an antenna system supporting first and second communication systems in accordance with still another embodiment of the present invention.

DETAILED DESCRIPTION OF THE PREFERRED EMBODIMENT

Figure 2:
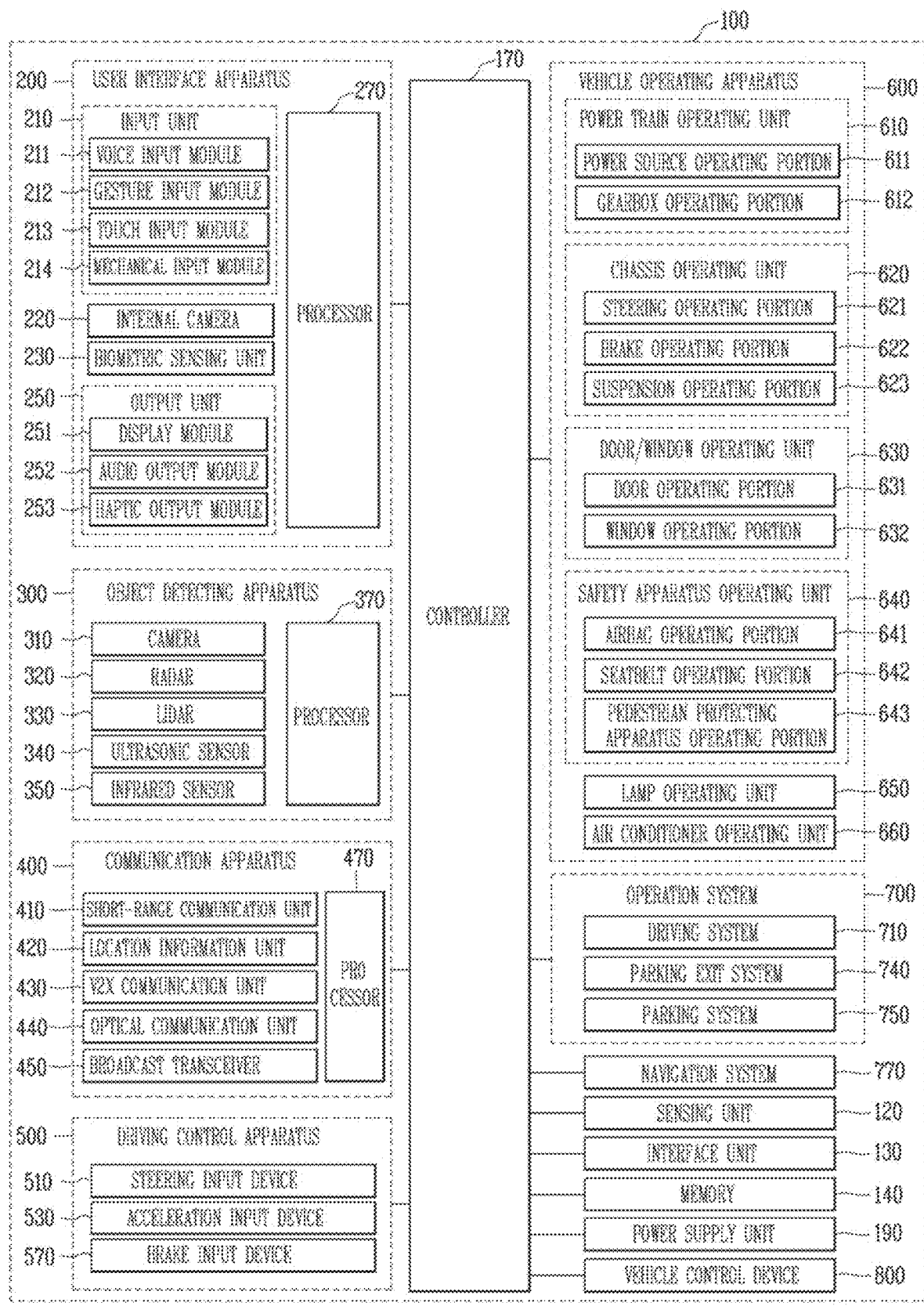
FIG. 2 is a block diagram illustrating a vehicle in accordance with an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The mobile terminal described in this specification may include a mobile terminal mounted in a vehicle. Examples of the mobile terminal disclosed herein may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs), etc.), and the like, which can be used in the vehicle if necessary.

On the other hand, the mobile terminal disclosed in this specification mainly refers to a vehicle terminal implemented by an antenna system mounted in a vehicle, but may also include a mobile terminal (electronic device) located inside a vehicle or possessed by a user aboard the vehicle.

FIG. 1 is a view illustrating a structure for mounting an antenna system in a vehicle in a mobile terminal having the antenna system loaded in the vehicle. In this regard, (a) of FIG. 1 shows a configuration in which the antenna system 1000 is loaded on a roof of the vehicle. On the other hand, (b) of FIG. 1 shows a structure in which the antenna system 1000 is loaded in a roof of a vehicle.

Referring to FIG. 1, in order to improve the appearance of the vehicle and to maintain a telematics performance at the time of collision, an existing shark fin antenna is replaced with a flat antenna of a non-protruding shape. In addition, the present invention proposes an integrated antenna of an LTE antenna and a 5G millimeter wave (mmWave) antenna considering fifth generation (5G) communication after 2020, while providing the existing mobile communication service (e.g., LTE). In this regard, the LTE antenna may be an LTE 4×4 MIMO (Multi-Input Multi-Output) antenna. In addition, the present invention proposes a package type antenna for enhancing durability of a patch antenna mounted inside from an impact.

Referring to (a) of FIG. 1, the antenna system 1000 is configured as a hexahedral structure and is disposed on a roof of the vehicle. In (a) of FIG. 1, a radome 2000a for protecting the antenna system 1000 from an external environment and external shocks while the vehicle travels may cover the antenna system 1000. The radome 2000a may be made of a dielectric material through which radio signals are transmitted/received between the antenna system 1000 and a base station.

Referring to (b) of FIG. 1, the antenna system 1000 may be disposed within a roof structure of the vehicle, and at least part of the roof structure may be made of a non-metallic material. At this time, the at least part of the roof structure 2000b of the vehicle may be realized by a non-metallic material, and may be made of a dielectric material through which radio signals are transmitted/received between the antenna system 1000 and the base station.

Meanwhile, the antenna system 1000 may be installed on a front or rear surface of the vehicle depending on applications other than a roof structure of the vehicle.

FIG. 2 is a block diagram illustrating a vehicle in accordance with an embodiment of the present invention.

As illustrated in FIGS. 1 to 2, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

Figure 7:
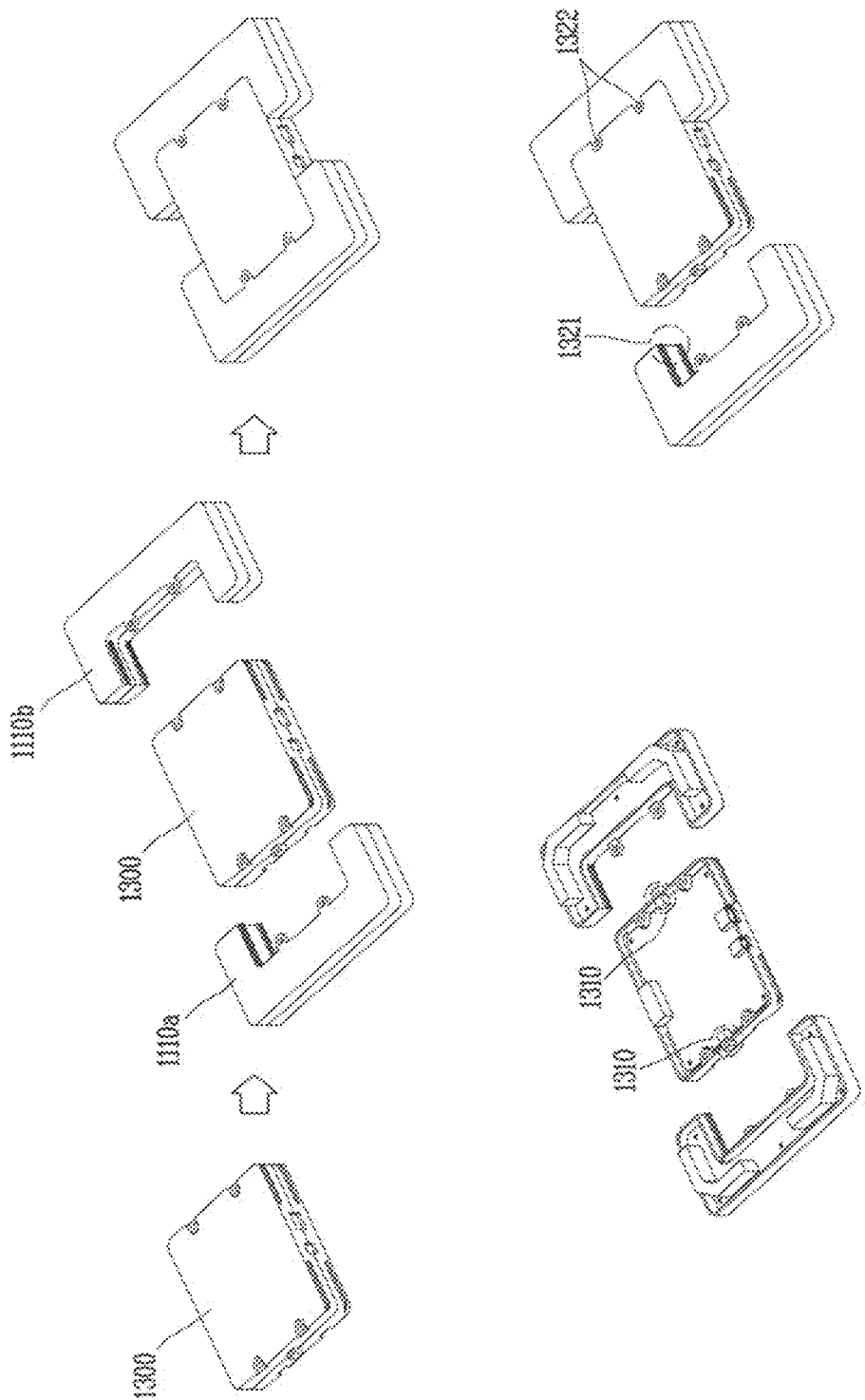
FIG. 7 is a view illustrating a coupling structure between antenna modules supporting a first communication system and a telematics module, and an antenna structure in accordance with one embodiment of the present invention.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCVV) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The wireless communication unit 460 is a unit that performs wireless communications with one or more communication systems through one or more antenna systems. The wireless communication unit 460 may transmit and/or receive a signal to a device in the first communication system through a first antenna system. In addition, the wireless communication unit 460 may transmit and/or receive a signal to a device in a second communication system through a second antenna system.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 related to the present invention can operate in any one of a manual driving mode and an autonomous driving mode. The driving modes of the vehicle 100 may include the manual driving mode and the autonomous driving mode.

Figure 3:
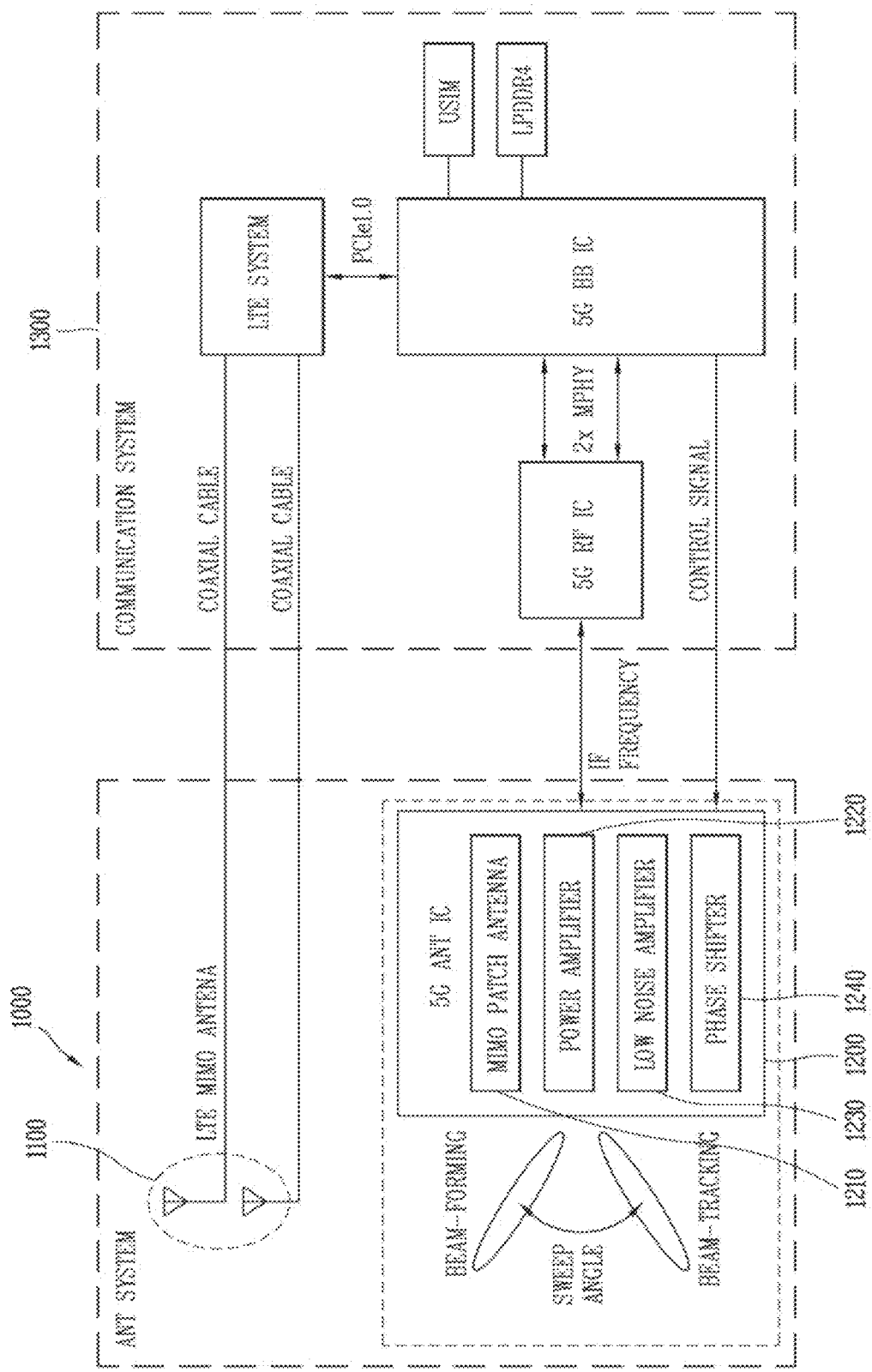
FIG. 3 is a view illustrating a detailed configuration of an antenna system having a telematics module and antenna modules according to the present invention.

FIG. 3 is a view illustrating a detailed configuration of an antenna system having a telematics module and antenna modules according to the present invention.

As illustrated in FIG. 3, the antenna system 1000 includes first and second communication systems (or first and second antenna systems) 1100 and 1200, which are coupled to a communication system 1300. Here, the communication system 1300 may be referred to as a telematics module or a communication module.

Meanwhile, a link connection state between the first and second antenna systems 1100 and 1200 will be described below. According to one embodiment, the first communication system 1100 and the second communication system 1200 may be configured to maintain a dual connectivity state. At this time, a first signal may be received from the first communication system 1100 when a second signal is not received from the second communication system 1200. That is, since the first communication system 200 always maintains the connection state even when a link connection with a base station is released in the second communication system 1200, the second signal may be received from the second communication system 1200. According to another embodiment, when the link connection through the second communication system 1200 is released, a fall back mode in which a connection with the first communication system 1100 is initiated is also be activated. Here, the first and second communication systems may be an LTE communication system and a 5G communication system, respectively, but are not limited thereto and can be freely changed according to applications.

The first antenna system 1100 may be configured to exchange radio signals with existing mobile communication systems (2G/3G/4G) and include a plurality of antenna elements 1110. The first antenna system 1100 may operate in a MIMO mode to receive a plurality of stream signals from a base station via the plurality of antenna elements. In this regard, the plurality of antennas may be two or four antennas, and the first antenna system 1100 may support 2×2 and 4×4 MIMO modes. In this case, the 2×2 and 4×4 MIMO modes correspond to a case where one terminal (vehicle) receives two stream signals and four stream signals transmitted from the base station, respectively. As described above, a case where a single terminal (vehicle) receives a plurality of streams from a base station may be referred to as a single user (SU)-MIMO mode. On the other hand, a case where a plurality of terminals (vehicles) receive the plurality of streams, respectively, may be referred to as a MU-MIMO mode. In order to support the SU-MIMO mode, the second antenna system 1100 must include a plurality of antenna elements.

The second antenna system 1200 may include an antenna 1210, a power amplifier 1220, a low noise amplifier (LNA) 1230, and a phase shifter 1240. On the other hand, the second antenna system 1200 may be configured to operate in a frequency band of 28 GHz, a frequency band of 20, 30, 60 GHz, or a sub-6 frequency band below 6 GHz.

The antenna 1210 may be disposed on a dielectric substrate in the form of a patch antenna. For example, the patch antenna 110 may be implemented in the form of a microstrip in which a radiating element and a ground plane are disposed on a top surface and a bottom surface of a dielectric substrate, respectively.

In the case of being configured as the array antenna of the first antenna system 1200, beam-forming is performed by controlling phase values applied to each element of the array antenna through the phase shifter 1240. For example, the beam-forming may be performed within a specific angular range in an azimuth direction and an elevation direction. In this regard, the second antenna system 1200 may generate a null pattern of a beam in an interference signal direction while performing beam-forming in a desired direction of the azimuth and elevation directions according to the change of the phase values by the phase shifter 1240. Meanwhile, the antenna 1210 may operate as a single antenna element by applying power only to one of the plurality of antenna elements of the array antenna.

That is, in relation to the antenna 1210, the configuration of the array antenna and the single antenna element may be variably configured according to power-on/off and a circuit configuration capable of supporting it. Therefore, when a signal level (or signal-to-interference ratio) is sufficient by virtue of a sufficiently close distance with a base station or another communication target device, the patch antenna 110 is variably configured as a single antenna element. On the other hand, when the signal level (or signal-to-interference ratio) is not sufficient, the patch antenna 1210 is variably configured as an array antenna.

The antenna 1210 may operate simultaneously as a transmission antenna for radiating a transmission signal from the power amplifier 110 into a free space and a reception antenna for transferring a reception signal from the free space to the low noise amplifier 1230. Accordingly, the antenna 1210 is configured to operate in both a transmission frequency band and a reception frequency band.

The power amplifier 1220 performs high-power amplification for a signal from a 5G RF IC and transmits the amplified signal through the patch antenna 100. In this regard, the power amplifier 120 may include a frequency up-converter that receives an intermediate frequency (IF) band signal from the 5G RF IC and converts the received signal into a radio frequency (RF) band signal.

The low noise amplifier 1230 performs low-noise amplification for a signal received through the antenna 1210 and transmits the amplified signal to the 5G RF IC. In this regard, the low-noise amplifier 1230 may include a frequency down-converter that downwardly converts the RF signal of 28 GHz to an IF signal.

On the other hand, when the patch antenna 1210 is configured as an array antenna, the phase shifter 1240 is configured to apply a different phase to each of elements of the array antenna. In this regard, the phase shifter 1240 is configured to operate in both a transmission frequency band and a reception frequency band. The phase shifter 1240 may adjust a phase in an analog or digital manner. In this regard, the phase shifter 1240 may receive a control signal for a phase control from a 5G BB IC. Also, since an insertion loss is caused due to an internal element, the phase shifter 1240 may control a phase of a signal received from the low-noise amplifier 1230. That is, the phase shifter 1240 may perform low-noise amplification for a signal received from the second antenna system 1200 and controls a phase of the amplified signal.

The communication system 1300 includes an LTE system which is interfaced with the first antenna system 1100, and a 5G RF IC which is interfaced with the second antenna system 1200. Meanwhile, the LTE system may include a 3G system to support 3G WCDMA fallback or a 2G system. At this time, the first antenna system 1100 may be interfaced with the LTE system through an RF cable or a coaxial cable.

In addition, the communication system 1300 may further include a 5G BB (Base Band) IC, an USIM, and an LPDDR4. Here, the 5G BB IC exchanges baseband signals with the first and second communication systems 1100 and 1200. Here, the 5G BB IC may be interfaced with the 5G RF IC through a 2× MPHY interface, and may be interfaced with the LTE system through a PCIe 1.0 interface. The USIM and the LPDDR4 correspond to a mobile communication user identification module and a memory, respectively.

Meanwhile, since the first antenna system 1100 operates in a lower frequency band than the second antenna system 1200, a wider arrangement interval is required for an independent operation between antenna elements. This is because isolation between the antenna elements is particularly important for operating the antenna elements in a MIMO mode.

Meanwhile, FIGS. 4 to 6 show an antenna loaded on a vehicle according to the present invention. In detail, FIG. 4 is a view illustrating an antenna system supporting a first communication system in accordance with one embodiment of the present invention. On the other hand, a second communication system may be in the form of a separate external antenna system. At this time, the first communication system may be an LTE communication system and the second communication system may be a 5G communication system, but the present invention is not limited thereto and can be changed depending on applications.

FIG. 5 is a view illustrating an antenna system supporting first and second communication systems in accordance with another embodiment of the present invention. As illustrated in FIG. 5, an antenna module supporting the second communication system may be disposed on a telematics module.

FIG. 6 is a view illustrating an antenna system supporting first and second communication systems in accordance with still another embodiment of the present invention. As illustrated in FIG. 6, an antenna module supporting the second communication system may be disposed in one structure together with antenna modules supporting the first communication system.

Referring to FIGS. 4 to 6, an antenna system 1000 includes a telematics module 1300, and antenna modules 1100a, 1100b coupled to both side surfaces of the telematics module 1300. Meanwhile, the antenna modules 1100a, 1100b may include a plurality of antenna elements disposed therein, and perform Multi-Input Multi-Output (MIMO) by transmitting and receiving a plurality of first signals according to a first communication system through the plurality of antenna elements.

Specifically, first to fourth antenna elements 1111 to 1114 are disposed in the antenna module 1100a, 1100b, to perform 4×4 MIMO. Meanwhile, the present invention may not be limited to the 4×4 MIMO, but a mobile terminal such as a vehicle and a base station of the first communication system may alternatively perform 2×2 or 8×8 MIMO.

As illustrated in (b) of FIG. 4, the first to fourth antenna elements 1111 to 1114 may be disposed in upper and lower ends of the antenna module 1100a located at a left side of the telematics module 1300, and upper and lower ends of the antenna module 1100b located at a right side of the telematics module. At this time, each of the first to fourth antenna elements 1111 to 1114 may include a first member, and a second member connected at a right angle to the first member so as to operate as an antenna together with the first member. For example, the first antenna 1111 within the antenna module 1100a may include a first member 1111a, and a second member 1111b connected at a right angle to the first member 1111a to operate as an antenna together with the first member 1111a. Here, a resonance length of an antenna may be defined by the sum of lengths of the first member and the second member. For example, a resonance length of the first antenna 1111 may be defined by the sum of lengths of the first member 1111a and the second member 1111b.

Accordingly, such bending antenna structure may allow for optimization of an antenna size and miniaturization of the antenna module 1100. Also, isolation among the first to fourth antenna elements 1111 to 1114 can be improved through the separated structure of the antenna modules 1100a, 1100b and the coupled telematics module 1300. For example, the first antenna element 1111 may have improved isolation from the second and fourth antenna elements 1112 and 1114 by the separated structure between the antenna modules 1100a, 1100b. In addition, the first and third antenna elements 1111 and 1113 may be configured to be fed at points adjacent to end portions of the first members 1111a and 1113a thereof. Accordingly, even in the same antenna module 1100a, fed points thereof are spaced apart from each other, so that the isolation can be improved.

As described above, a second antenna module 1200a, which is an antenna module supporting the second communication system, may be disposed on an upper part of the telematics module 1300. As the second antenna module 1200a is arranged at the upper part of the telematics module 1300, there is an advantage that signal interference with the first antenna modules 1100a, 1100b, which are the antenna modules supporting the first communication system, does not occur.

Referring to FIG. 5, the antenna system 1000 may further include a second antenna module 1200a disposed on an upper part of the telematics module 1300. At this time, the second antenna module 1200a has a plurality of array antennas disposed therein. Also, the second antenna module

1200a may transmit or receive second signals according to the second communication system through any one of the plurality of array antennas.

In this regard, first to fourth array antennas 1211 to 1214 may be disposed in the second antenna module 1200a, and beam-forming may be performed through any one of the first to fourth array antennas 1211 to 1214. However, the present invention is not limited to this, and MIMO may alternatively be performed using two or more of the first to fourth array antennas 1211 to 1214.

Meanwhile, in the case of the structure in which the first to fourth array antennas 1211 to 1214 of the second antenna module 1200a are arranged at 90-degree intervals from one another, as the second antenna module 1200a is disposed on a top of the telematics module 1300, the following effects can be obtained. Specifically, as the first to fourth array antennas 1211 to 1214 are arranged at the upper part, signal interference with the first to fourth antenna elements 1111 to 1114 of the first antenna modules 1100a, 1100b may not occur.

More specifically, the second antenna module 1200a may be located at a position corresponding to a position between two antennas, which are arranged in a horizontal or perpendicular direction among the first to fourth antenna elements 1111 to 1114 of the first antenna modules 1100a, 1100b. Accordingly, horizontal heights at which the first antenna modules 1100a, 1100b and the second antenna module 1200a are arranged should be different from each other as shown in FIG. 5.

Meanwhile, the first to fourth array antennas 1211 to 1214 may have a form printed on a substrate which is formed perpendicular to a lower end portion which corresponds to a bottom surface of the first antenna modules 1100a, 1100b. At this time, the first to fourth array antennas 1211 to 1214 may be arranged at intervals of 90 degrees to cover different regions in an azimuth direction. For example, the first to fourth array antennas 1211 to 1214 may be disposed at 90-degree intervals from one another, to cover 90-degree regions that are 90 degrees apart from one another in the azimuth direction.

Accordingly, when MIMO is performed using two or more of the first to fourth array antennas 1211 to 1214, different regions can be covered in the azimuth direction. This may allow spatial diversity between a plurality of MIMO streams according to beams covering different regions in the azimuth direction.

Meanwhile, referring to FIG. 6, the antenna system 1000 may have a plurality of array antennas disposed inside the antenna modules 1100a, 1100b. At this time, the antenna modules 1100a, 1100b may transmit or receive second signals according to the second communication system through any one of the plurality of array antennas.

In this regard, first to fourth array antennas 1211' to 1214' may be provided in the antenna modules 1100a, 1100b, and beam-forming may be performed through one of the first to fourth array antennas 1211' to 1214'. However, the present invention is not limited thereto, and MIMO may alternatively be performed by using two or more of the first to fourth array antennas 1211' to 1214'.

On the other hand, the first to fourth array antennas 1211' to 1214' may have a form printed on a substrate that is formed perpendicular to the lower end portion as the bottom surface of the first antenna modules. At this time, the first to fourth array antennas 1211' to 1214' may be arranged at 90-degree intervals to cover different regions in the azimuth direction. For example, the first to fourth array antennas 1211' to 1214' may be arranged at 90-degree intervals from one another, to cover different 90-degree regions that are 90 degrees apart from one another in the azimuth direction.

Specifically, the first and second array antennas 1211' and 1212' may be disposed at a 90-degree interval from each other with respect to a center line within the antenna module 1100a connected to the left side of the telematics module 1300. Also, the third and fourth array antennas 1213' and 1214' may be disposed at a 90-degree interval from each other with respect to the center line within the antenna module 1100b connected to the right side of the telematics module 1300.

Figure 8:
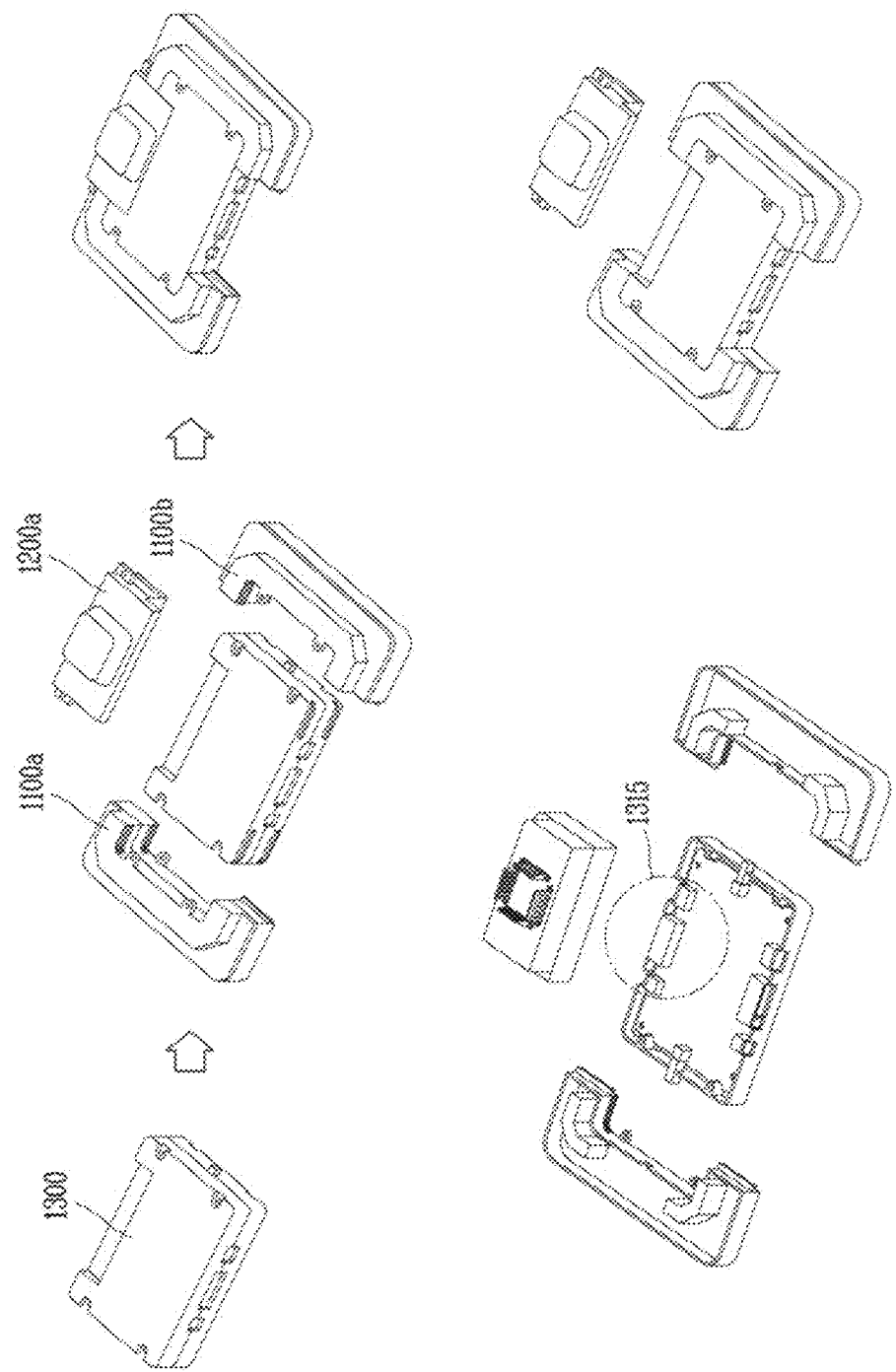
FIG. 8 is a view illustrating a coupling structure between antenna modules supporting first and second communication systems and a telematics module, and an antenna structure in accordance with another embodiment of the present invention.
Figure 9:
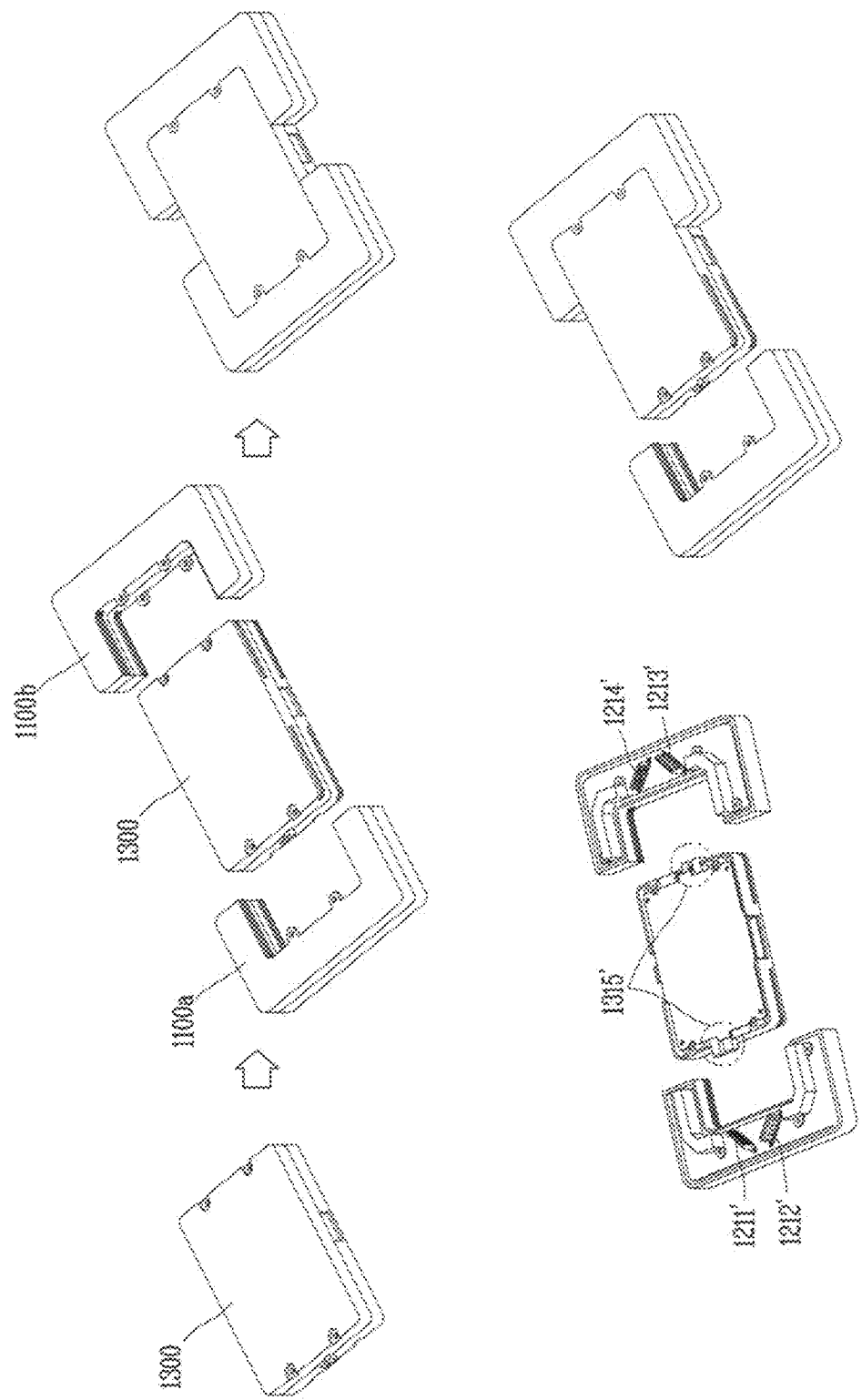
FIG. 9 is a view illustrating a coupling structure between antenna modules supporting first and second communication systems and a telematics module, and an antenna structure in accordance with another embodiment of the present invention.

FIGS. 7 to 9 show a coupling structure between the antenna modules and the telematics module and an antenna structure shown in FIGS. 4 and 6. In detail, FIG. 7 is a view illustrating a coupling structure between antenna modules supporting a first communication system and a telematics module, and an antenna structure in accordance with one embodiment of the present invention.

Referring to FIG. 7, an antenna system 1000 includes a telematics module 1300, and antenna modules 1100a, 1100b coupled to both side surfaces of the telematics module 1300. In this manner, as the antenna modules 1100a, 1100b are coupled to the both side surfaces of the telematics module 1300, an integrated flat antenna module may be provided at a vehicle.

Specifically, the antenna modules 1100a, 1100b may be coupled to the both side surfaces of the telematics module 1300 through RF connectors 1310, respectively. At this time, a plurality of antenna elements 1111 to 1114 operating in a first communication system may be fed through the RF connectors 1310.

The antenna modules 1100a, 1100b may be coupled to the both side surfaces of the telematics module 1300 by sliding rail structures 1321. The antenna modules 1100a, 1100b may be coupled to upper and lower end portions of the telematics module 1300, which correspond to the both side surfaces, by use of bolts 1322.

FIG. 8 is a view illustrating a coupling structure between antenna modules supporting first and second communication systems and a telematics module, and an antenna structure in accordance with another embodiment of the present invention. As illustrated in FIGS. 5 and 8, an antenna module supporting a second communication system may be disposed on an upper part of the telematics module.

Referring to FIG. 8, an antenna system 1000 includes a telematics module 1300, and antenna modules 1100a, 1100b coupled to both side surfaces of the telematics module 1300. In this manner, as the antenna modules 1100a, 1100b are coupled to the both side surfaces of the telematics module 1300, an integrated flat antenna module may be provided at a vehicle. Meanwhile, a second antenna module 1200a may be further disposed on the telematics module 1300. In this manner, a plurality of array antennas, for example, first to fourth array antennas 1211 to 1214, may be disposed in the second antenna module 1200a, separately from the antenna modules 1100a, 1100b. In this manner, an interference level between the plurality of antenna systems can be lowered by arranging the plurality of array antennas in such separate second antenna module 1200a. At this time, in order to maintain the advantages of the integrated flat antenna module, a groove may be formed in the telematics module 1300, and the second antenna module 1200a may be disposed in the groove.

Also, in order to protect the plurality of array antennas, for example, the first to fourth array antennas 1211 to 1214 from an external environment, the second antenna module 1200a may be formed in a radome shape.

Meanwhile, the telematics module 1300 may be connected to the second antenna module 1200a through a 2×4 port connector 1315. At this time, the plurality of array antennas operating in a second communication system may be fed through the 2×4 port connector 1315.

The antenna modules 1100a, 1100b may be coupled to the telematics module 1300 at the both side surfaces of the telematics module 1300 by the sliding rail structures 1321 as illustrated in FIG. 7. The antenna modules 1100a, 1100b may be coupled to upper and lower end portions of the telematics module 1300, which correspond to the both side surfaces, by use of bolts 1322.

Meanwhile, FIG. 9 is a view illustrating a coupling structure between antenna modules supporting first and second communication systems and a telematics module, and an antenna structure in accordance with another embodiment of the present invention. As illustrated in FIGS. 6 and 9, an antenna module supporting a second communication system may be disposed in one structure together with antenna modules supporting a first communication system.

On the other hand, the antenna modules 1100a, 1100b may be coupled to the both side surfaces of the telematics module 1300 through 2×4 connectors 1315', respectively. At this time, a plurality of antenna elements 1111 to 1114 operating in the first communication system and a plurality of array antennas 1211' to 1114' operating in the second communication system may be fed through the 2×4 port connectors 1315'.

The antenna modules 1100a, 1100b may be coupled to the telematics module 1300 at the both side surfaces of the telematics module 1300 by the sliding rail structures 1321 as illustrated in FIG. 7. The antenna modules 1100a, 1100b may also be coupled to upper and lower end portions of the telematics module 1300, which correspond to the both side surfaces, by use of the bolts 1322 as illustrated in FIG. 7.

Figure 10:
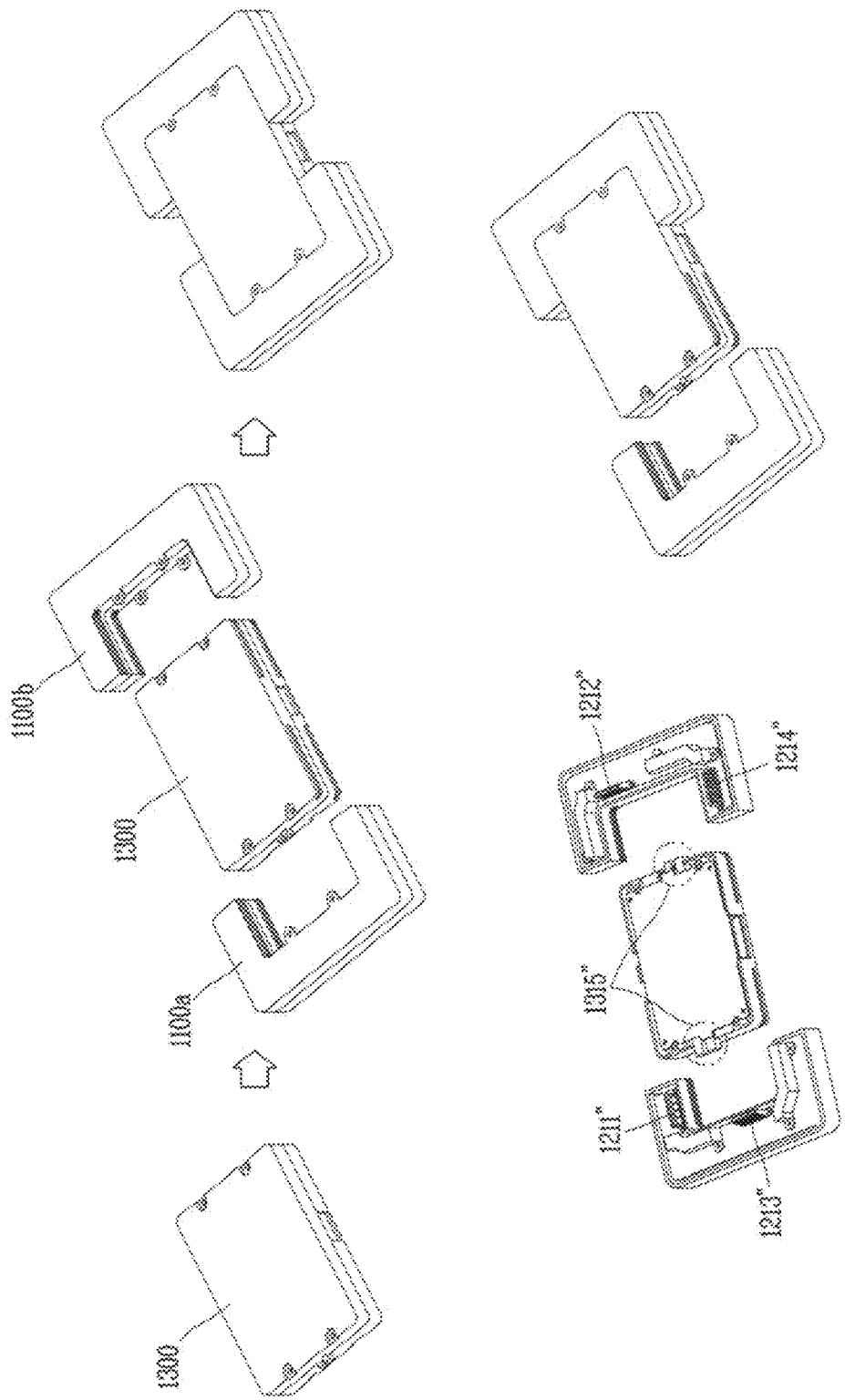
FIG. 10 is a view illustrating a structure in which a plurality of array antennas of a second antenna system are differently arranged, in the coupling structure between the antenna modules and the telematics module of FIG. 9.

Meanwhile, FIG. 10 is a view illustrating a structure in which a plurality of array antennas of a second antenna system are differently arranged, in the coupling structure between the antenna modules and the telematics module of FIG. 9.

As illustrated in FIG. 10, the antenna module supporting the second communication system may be disposed in one structure together with the antenna modules supporting the first communication system.

Similar to FIG. 9, the antenna modules 1100a, 1100b may be coupled to the both side surfaces of the telematics module 1300 through 2×4 port connectors 1315". At this time, a plurality of antenna elements 1111 to 1114 operating in the first communication system and a plurality of array antennas 1211" to 1114" operating in the second communication system may be fed through the 2×4 port connectors 1315".

However, the first to fourth array antennas 1211" to 1214" may be disposed at 90-degree intervals, adjacent to the first to fourth antenna elements 1111 to 1114. In this regard, since operating frequencies of the first to fourth array antennas 1211" to 1214" are different from operating frequencies of the first to fourth antenna elements 1111 to 1114, there is no problem in isolation between them. On the other hand, the first to fourth antenna elements 1111 to 1114 may be arranged at 90-degree intervals with respect to one another, thereby improving the isolation between them. In addition, as the first to fourth array antennas 1211" to 1214" are disposed adjacent to the first to fourth antenna elements 1111 to 1114, the isolation between the adjacent first to fourth antenna elements 1111 to 1114 can be further improved.

On the other hand, the antenna modules 1100a, 1100b may be coupled to the both side surfaces of the telematics module 1300 through 2×4 connectors 1315", respectively. At this time, the plurality of antenna elements 1111 to 1114 operating in the first communication system and the plurality of array antennas 1211 to 1114 operating in the second communication system may be fed through the 2×4 port connectors 1315". However, unlike the structure illustrated in FIG. 9, arranged positions of the 2"4 port connectors 1315" are changeable because of the changes in fed positions of the first to fourth antenna elements 1111 to 1114 and the first to fourth array antennas 1211" to 1214". For example, to minimize a loss in a millimeter waveband, the first to fourth array antennas 1211" to 1214" may be directly connected through the 2×4 port connectors 1315", without a separate RF cable connection.

The antenna modules 1100a, 1100b may be coupled to the telematics module 1300 at the both side surfaces of the telematics module 1300 by the sliding rail structures 1321 as illustrated in FIG. 7. The antenna modules 1100a, 1100b may also be coupled to upper and lower end portions of the telematics module 1300, which correspond to the both side surfaces, by use of the bolts 1322 as illustrated in FIG. 7.

The foregoing description has been given of the antenna system loaded on the vehicle according to one aspect of the present invention. Hereinafter, a vehicle equipped with an antenna system according to another aspect of the present invention will be described.

Referring to FIGS. 1, 2, and 4, a vehicle equipped with an antenna system 1000 includes a telematics module 1300, a controller 170, and antenna modules 1100a, 1100b. Here, a part of the wireless communication unit 460 may be disposed in the antenna modules 1100a, 1100b, and another part of the wireless communication unit 460 may be disposed in the telematics module 1300.

At this time, the controller 170 is configured to control the telematics module 1300 and components of the vehicle. For example, the controller 170 may control the driving system 7000 or the driving control apparatus 500 using radio signals received through the second communication system 1200. This may allow autonomous driving to be performed or enhance driving safety and driving convenience.

On the other hand, the antenna modules 1100a, 1100b may be coupled to both side surfaces of the telematics module 1300. In addition, the antenna modules 1100a, 1100b may have a plurality of antenna elements disposed therein. Meanwhile, the antenna modules 1100a, 1100b may perform Multi-Input Multi-Output (MIMO) by transmitting and receiving a plurality of first signals according to a first communication system through the plurality of antenna elements.

In this regard, the first to fourth antenna elements 1111 to 1114 are disposed in the antenna modules 1100a, 1100b, to perform 4×4 MIMO. At this time, the first to fourth antenna elements 1111 to 1114 may be disposed in upper and lower ends of the antenna module located at a left side of the telematics module, and upper and lower ends of the antenna module located at a right side of the telematics module.

On the other hand, referring to FIGS. 1, 2 and 5, the vehicle equipped with the antenna system 1000 may further include the second antenna module 1200a disposed on the upper part of the telematics module 1300. At this time, the second antenna module 1200a may have the plurality of array antennas disposed therein. Also, the second antenna module 1200a may transmit or receive the second signals according to the second communication system through any one of the plurality of array antennas.

In this regard, the first to fourth array antennas 1211 to 1214 may be disposed in the second antenna module 1200a, and beam-forming may be performed through any one of the first to fourth array antennas 1211 to 1214. At this time, the first to fourth array antennas 1211 to 1214 may be arranged at the 90-degree intervals to cover the 90-degree regions in the azimuth direction.

On the other hand, referring to FIGS. 1, 2, and 6, in the vehicle equipped with the antenna system 1000, the plurality of array antennas may be disposed inside the antenna modules 1110*a*, 1110*b*. Also, the antenna modules 1110*a*, 1110*b* may transmit or receive the second signals according to the second communication system through any one of the plurality of array antennas.

In this regard, the first to fourth array antennas 1211' to 1214' may be provided in the antenna modules 1100*a*, 1100*b*, and beam-forming may be performed through one of the first to fourth array antennas 1211' to 1214'. Here, the first to fourth array antennas 1211 to 1214' may have the printed form on the substrate that is formed perpendicular to the lower end portion.

On the other hand, the first and second array antennas 1211' and 1212' may be disposed at the 90-degree interval from each other with respect to the center line within the antenna module 1100*a* connected to the left side of the telematics module 1300.

Also, the third and fourth array antennas 1213' and 1214' may be disposed at the 90-degree interval from each other with respect to the center line within the antenna module 1100*b* connected to the right side of the telematics module 1300.

The foregoing description has been given of the antenna system 1000 loaded on the vehicle and the vehicle equipped with the antenna system 1000. Meanwhile, the description of the antenna system 1000 loaded on the vehicle may, of course, be applied to the vehicle equipped with the antenna system 1000.

Hereinafter, effects of an antenna system loaded on a vehicle and a method of controlling the same according to the present invention will be described.

According to the present invention, a plurality of communication services can be provided through a flat vehicle antenna having beamforming array antennas capable of providing a next generation communication service and MIMO antennas capable of providing an existing mobile communication service.

In addition, according to the present invention, a plurality of communication services can be provided by using one or more antenna modules integrally coupled to a telematics module.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

The controller (modem or application processor) can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A vehicle antenna system for being loaded on a vehicle, comprising:
   a telematics part; and
   an antenna structure coupled to at least one side surface of the telematics part,
   wherein the antenna structure includes a plurality of antenna elements configured to transmit or receive first radio signals in a first communication system,
   wherein an end portion of the telematics part corresponding to the at least one side surface of the telematics part is directly connected with at least one side surface of the antenna structure on a same plane as the antenna structure,
   wherein the antenna structure further includes an inner side surface and an outer side surface, and
   wherein the at least one side surface of the telematics part is connected on a same plane as the inner side surface of the antenna structure.

2. The vehicle antenna system of claim 1, wherein the antenna structure includes first, second, third and fourth antenna elements configured to perform Multiple-Input and Multi-Output (MIMO) communication, and
   wherein the first, second, third and fourth antenna elements are disposed at upper and lower end portions within the antenna structure.

3. The vehicle antenna system of claim 2, wherein the first, second, third and fourth antenna elements are disposed at a left upper end portion, a right upper end portion, a left lower end portion and a right lower end portion within the antenna structure.

4. The vehicle antenna system of claim 1, wherein the plurality of antenna elements are formed of a package type antenna mounted on the antenna structure.

5. The vehicle antenna system of claim 1, wherein the plurality of antenna elements are formed of patch antennas mounted on the antenna structure.

6. The vehicle antenna system claim 1, wherein the at least one side surface of the telematics part is coupled to the antenna structure through a connector formed at the at least one side surface of the telematics part.

7. The vehicle antenna system of claim 1, further comprising a second antenna part including a plurality of antenna elements configured to transmit or receive second radio signals in a second communication system.

8. The vehicle antenna system of claim 7, wherein the second antenna part is disposed on the same plane as the antenna structure.

9. The vehicle antenna system of claim 7, wherein the second antenna part is disposed on an upper part of the antenna structure or the telematics part coupled to the antenna structure.

10. The vehicle antenna system of claim 1, wherein the antenna structure is disposed within a roof structure of the vehicle, and
    wherein the roof structure is formed of a non-metallic material which the first radio signals are transmitted from or received at the vehicle antenna.

11. The vehicle antenna system of claim 7, wherein the second antenna part is formed in a radome shape.

12. The vehicle antenna system of claim 11, wherein the second antenna part is formed in the radome shape on a roof structure of the vehicle.

13. The vehicle antenna system of claim 7, further comprising a processor configured to control the first radio signals to be received from the first communication system when the second radio signals are not received from the second communication system.

14. The vehicle antenna system of claim 13, wherein the processor further configured to:
 release a second link with the second communication system in a dual connectivity state with the first communication system and the second communication system; and
 control the first radio signals to be received from the first communication system through a first link with the first communication system.

15. A vehicle equipped with an antenna system, comprising:
 a telematics part;
 an antenna structure coupled to at least one side surface of the telematics part; and
 a processor configured to control components of the telematics part and control first radio signals to be transmitted or received,
 wherein the antenna structure includes a plurality of antenna elements configured to transmit or receive first radio signals in a first communication system,
 wherein an end portion of the telematics part corresponding to the at least one side surface of the telematics part is directly connected with at least one side surface of the antenna structure on a same plane as the antenna structure, and
 wherein the antenna structure is coupled to the at least one side surface of the telematics part through a connector connected on a same plane as the at least one side surface.

16. The vehicle of claim 15, wherein the processor is configured to control Multiple-Input and Multi-Output (MIMO) communication to be performed using first, second, third and fourth antenna elements in the antenna structure, and
 wherein the first, second, third and fourth antenna elements are disposed at upper and lower end portions within the antenna structure.

17. The vehicle of claim 16, wherein the first, second, third and fourth antenna elements are disposed at a left upper end portion, a right upper end portion, a left lower end portion and a right lower end portion within the antenna structure.

18. The vehicle of claim 15, further comprising a second antenna part including a plurality of antenna elements configured to transmit or receive second radio signals in a second communication system,
 wherein the second antenna part is disposed on an upper part of the antenna structure or the telematics part coupled to the antenna structure, and
 wherein the antenna structure is disposed within a roof structure of the vehicle.

* * * * *